United States Patent
McCraw et al.

(10) Patent No.: US 12,142,000 B2
(45) Date of Patent: Nov. 12, 2024

(54) METHOD AND SYSTEM FOR OPTIMIZING A VIEWER POSITION WITH RESPECT TO A DISPLAY DEVICE

(71) Applicant: CBS Interactive Inc., San Francisco, CA (US)

(72) Inventors: Joseph McCraw, San Luis Obispo, CA (US); Francis Bato, Oakland, CA (US)

(73) Assignee: CBS Interactive Inc., San Francisco, CA (US)

( * ) Notice: Subject to any disclaimer, the term of this patent is extended or adjusted under 35 U.S.C. 154(b) by 61 days.

(21) Appl. No.: 17/983,913

(22) Filed: Nov. 9, 2022

(65) Prior Publication Data
US 2024/0153125 A1    May 9, 2024

(51) Int. Cl.
*G06T 7/70* (2017.01)
*H04N 13/366* (2018.01)

(52) U.S. Cl.
CPC ............ *G06T 7/70* (2017.01); *G06T 2200/24* (2013.01); *H04N 13/366* (2018.05)

(58) Field of Classification Search
CPC ..... G06T 7/70; G06T 2200/24; H04N 13/366; H04N 13/383
See application file for complete search history.

(56) References Cited

U.S. PATENT DOCUMENTS

| | | | |
|---|---|---|---|
| 8,225,229 B2* | 7/2012 | Thorn | G06F 1/3265 715/767 |
| 9,898,076 B1* | 2/2018 | Shah | G09G 3/20 |
| 2007/0279591 A1* | 12/2007 | Wezowski | G06F 3/013 351/208 |
| 2012/0249540 A1* | 10/2012 | Yoshino | H04N 13/341 345/419 |
| 2015/0015671 A1* | 1/2015 | Kellerman | G06F 3/012 348/46 |
| 2015/0220773 A1* | 8/2015 | Lucey | H04N 7/15 348/14.16 |
| 2018/0253143 A1* | 9/2018 | Saleem | G09G 5/003 |

* cited by examiner

*Primary Examiner* — Alazar Tilahun
(74) *Attorney, Agent, or Firm* — Rimon PC; Marc S. Kaufman

(57) ABSTRACT

A system and method for positioning a viewing device relative to a display, the display by leveraging the capability of a user device, such as a smartphone. An image of the display is captured using a camera and a positioning UI is superimposed over the image to indicate positioning.

6 Claims, 6 Drawing Sheets

Front View          Side View

METHOD AND SYSTEM FOR OPTIMIZING A VIEWER POSITION WITH RESPECT TO A DISPLAY DEVICE

BACKGROUND

There are many applications for which it is desirable to optimize the position a viewer with respect to a display device. For example, it is often desirable to "center" a viewer on a display device, i.e. position the viewer's eyes or other image capture mechanism near a center orthogonal axis of a display device. For example, many display devices are designed to provide optimum brightness and resolution to a position on the center, orthogonal to the device. Display technology, such as TV monitors and projectors each have specific limitations and constraints for effective delivery of video content. Therefore, viewing any content, such as a video, a picture, or the like can be optimized by placing the viewers eyes at an optimum viewing angle with respect to the display device to optimize image uniformity, focus, gain, reflectivity, dimming, and gamma curve.

Various systems have been designed to address the issue of viewer positioning. For example, US Patent Publication No. 20180253143 discloses an alignment system for positioning a user at an optimum position with respect to a screen of a display device. The system includes a mechanical positioning mechanism attached to the screen to adjust the viewing position of the screen by translation and rotation. A camera located on the screen is used to capture an image of the user's face and an image processing positioning algorithm is applied to determine the position of the user's eyes with respect to the screen. The device disclosed in US Patent Publication No. 20180253143 requires complex hardware and software and is not pragmatic for use in general purpose viewing devices (such as televisions, computers, phones, and tablets) on which most content is consumed.

SUMMARY OF THE INVENTION

The disclosed implementations provide a simple mechanism for properly positioning a viewer, such as the eyes of a user, with respect to a display device. The disclosed implementations leverage a simple camera, such as that which is ubiquitous in mobile phones, to perform alignment. The display device is not required to have any specialized mechanism for view positioning.

A first aspect of the invention is a method for positioning a viewing device relative to a display, the display having a known two-dimensional shape and a known optimum viewing angle, the method comprising: capturing an image of the display using a camera; analyzing the image of the display by applying a positioning algorithm to determine a viewing angle corresponding to a position of the camera relative to the display; displaying a user interface (UI) in connection with the image to indicate the viewing angle; and when the viewing angle corresponds to the optimum viewing angle, presenting an indicator of optimum positioning in the UI.

BRIEF DESCRIPTION OF THE DRAWINGS

The foregoing summary, as well as the following detailed description of the invention, will be better understood when read in conjunction with the appended drawings. For the purpose of illustrating the invention, there are shown in the appended drawings various illustrative embodiments. It should be understood, however, that the invention is not limited to the precise arrangements and instrumentalities shown. In the drawings.

DETAILED DESCRIPTION

Figure 1:
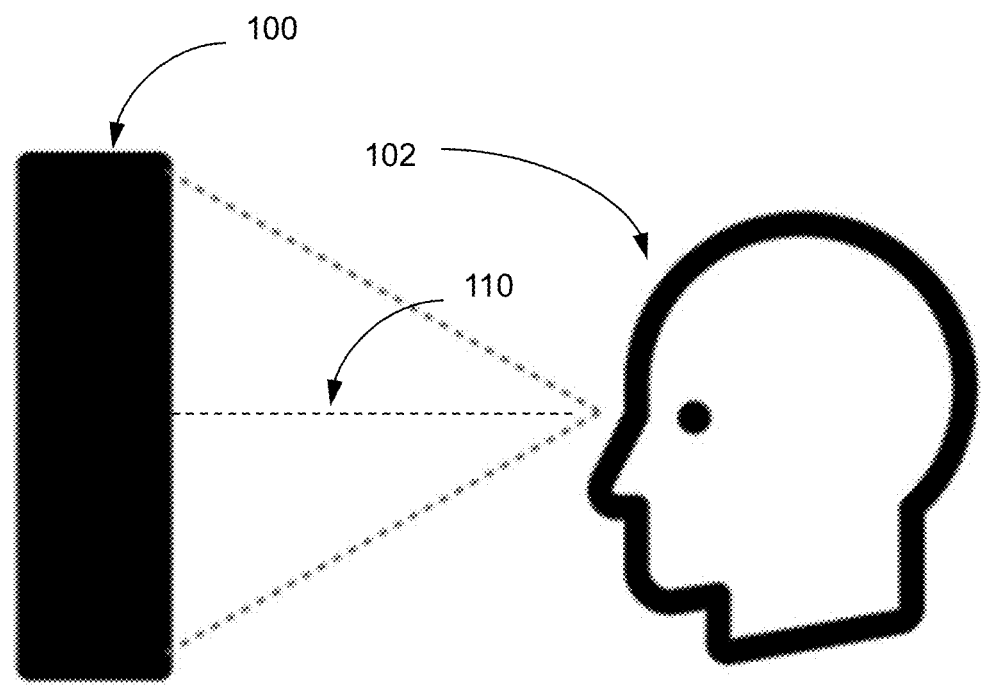
FIG. 1 illustrates an example of optimized viewing angle in accordance with disclosed implementations.

FIG. 1 illustrates an example of an optimized viewing angle. In this example, display 100 is the screen of a computer and the viewing device is the eyes of user 102. "Viewing device" or "viewer", as used herein, includes any mechanism for receiving an image displayed on display 100, such as the eyes of a viewer/user, a camera, or any other image capture/sensing device. In the example of FIG. 1, display 100 has an optimum viewing position that is along orthogonal axis 110 of the plane of display 100. Of course, various displays can be optimized for various viewing angles and positions. The term "display", as used herein, includes any surface on which an image is displayed, such as a computer screen, television, billboard, projection screen, work of art, or the like.

Figure 2:
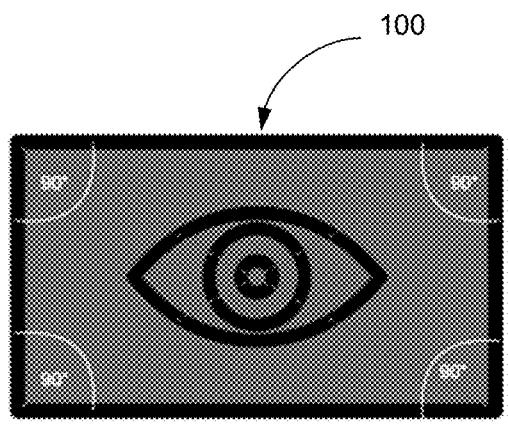
FIG. 2 is a schematic representation of geometry that is used for positioning of a viewing device in accordance with disclosed implementations.
Figure 2:
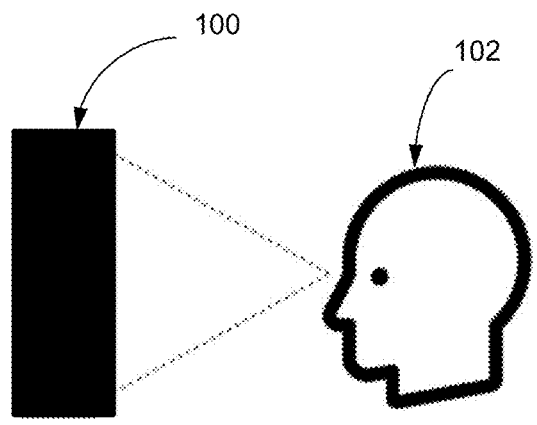
Figure 2:
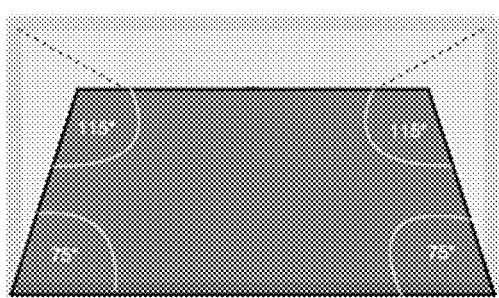
Figure 2:
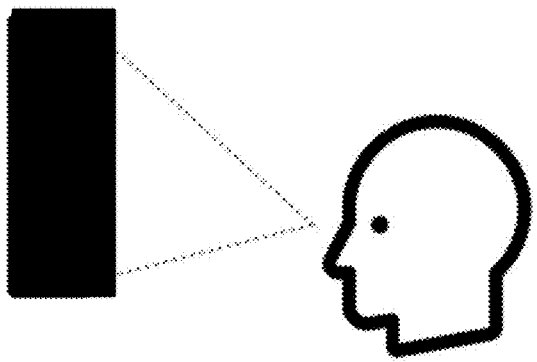

FIG. 2 shows two examples of viewing angles for display 100 of FIG. 1. At the top of FIG. 2, the eyes of user 102 are positioned on the orthogonal axis of display device 100. In this situation, it can be seen that an image capture of a rectangular display, from the viewing position, will result in a 90 degree angle for all four corners of the rectangular display. At the bottom of FIG. 2, the eyes of user 102 are positioned below the orthogonal axis of display device 100. In this situation, it can be seen that an image capture of a rectangular display, from the viewing position, will result in the lower corners having an angle of less than 90 degrees and the upper corners having an angle of more than 90 degrees. Of course, to a human viewer it will be difficult to discern the angles because the human brain is conditioned to correct the angles based on expectations for a rectangular shaped device.

Methods and systems of the disclosed implementations allow correction and alignment of a viewer for optimal display fidelity of arbitrarily oriented displays. IN one example, a camera is used to detect rectangular displays and calculate the angle of offset relative to optimal positioning. This improves vision (both mechanical and human) by providing feedback to improve resolution salience and image transmission uniformity.

By leveraging shape detection in an Augmented Reality (AR) context, disclosed implementation can measure the angle of the corners of a rectilinear display. As noted above, 90 degree angles in each corner correspond to the viewer being centered relative to the plane the display occupies in 3-dimensional space. This combination of user feedback can help users to achieve an optimal viewing experience in any environment, Disclosed implementations can also be utilized in mixed reality environments (AR/VR/XR/Mixed-Reality).

Figure 3:
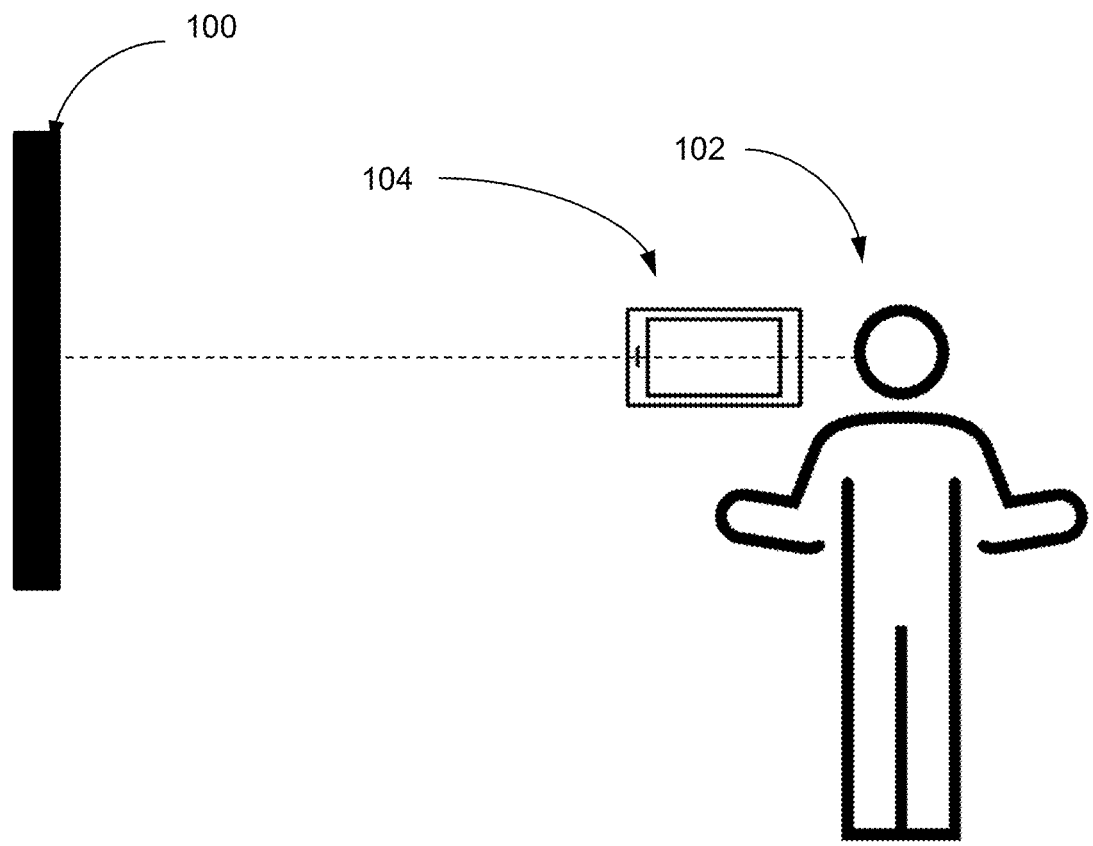
FIG. 3 is a schematic representation of a system for positioning of a viewing device in accordance with disclosed implementations.

FIG. 3 illustrates an example of user 102 leveraging the camera and processing capability of smartphone 104 to determine an optimum position for viewing display 100. An application (app) can be downloaded and executed on smartphone 104 to accomplish the positioning methods in accordance with disclosed embodiments. The user opens the app and views the display through the camera of smartphone 104. It is assumed that the camera lens is positioned in a manner to substantially reflect the position of the viewing device (i.e., the eyes of user 102 in this example).

Figure 4:
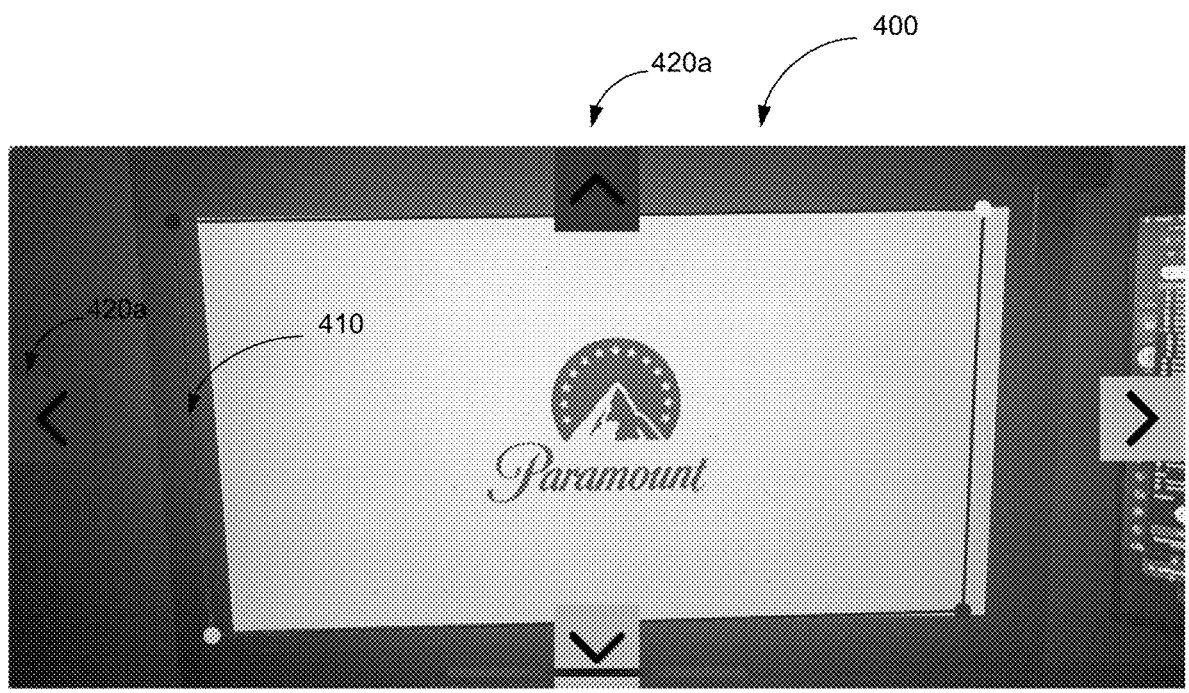
FIG. 4 is an example of a user interface in accordance with disclosed implementations.
Figure 5:
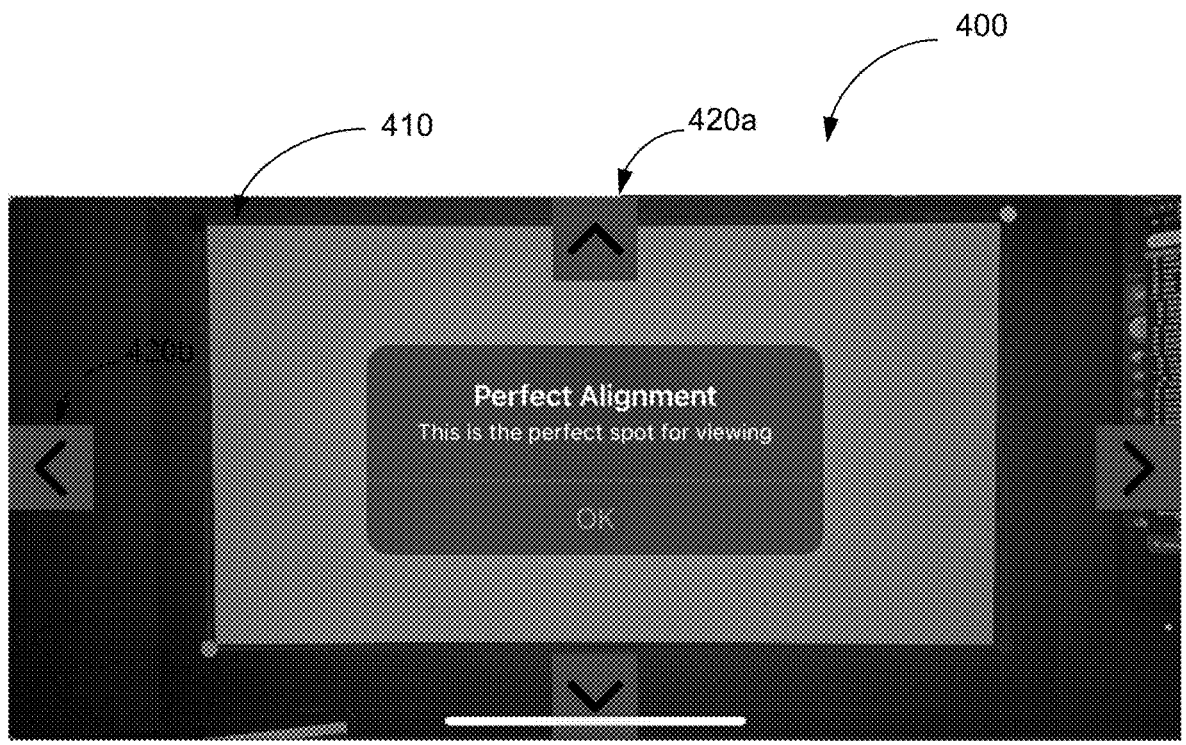
FIG. 5 is another example of a user interface in accordance with disclosed implementations.

FIG. 4 shows an example of the user interface (UI) 400 of smartphone 104 when accomplishing a positioning method. In the example of FIG. 4, the UI shows user 102 that the camera of smartphone 104 is positioned to the upper left of the display. This is evident by the offset of alignment box 410, which is superimposed over the image of the rectangular display, as well as the red arrows 420a and 420b at the top and left of the UI. FIG. 5 shows correct positioning. Note that, in FIG. 5, alignment box is substantially aligned with the edges of the rectangular display and arrows 420a and 420b are not highlighted in red. Further, in this example of the UI, a written message indicating proper alignment is shown.

Figure 6:
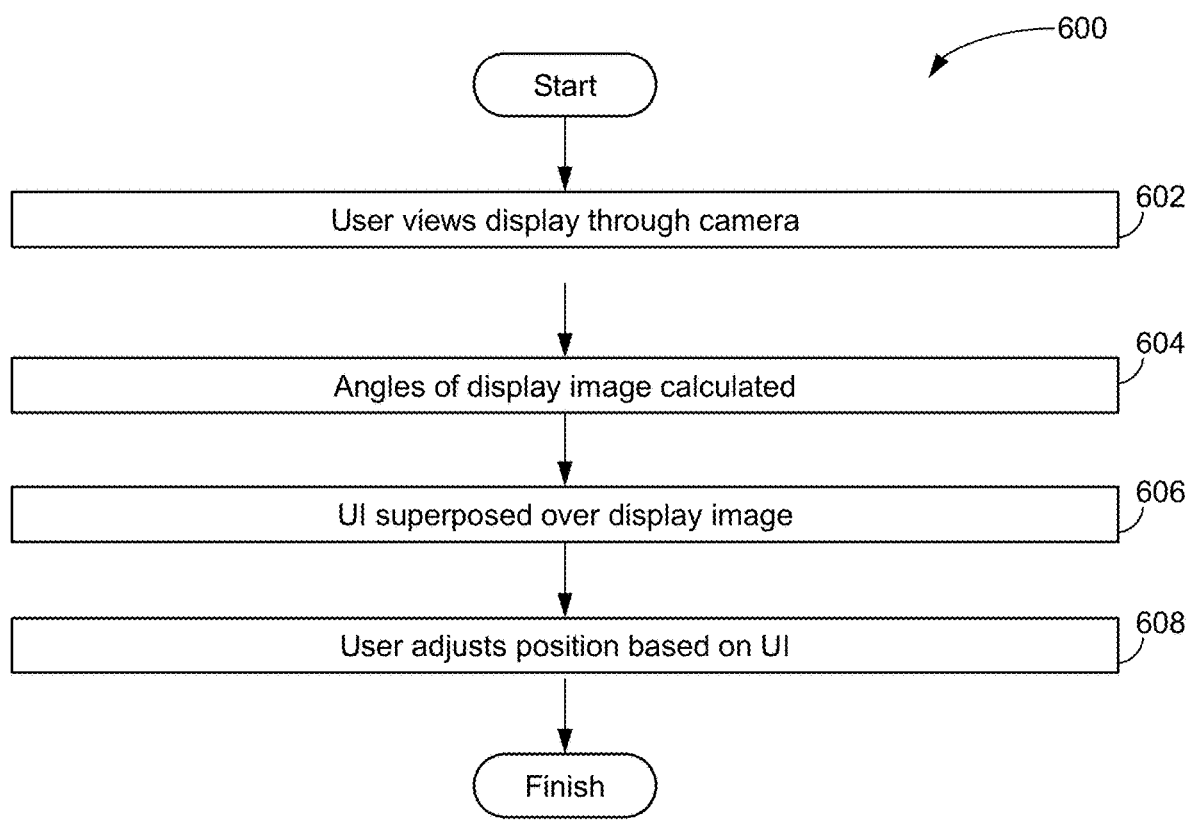
FIG. 6 is a flowchart of a method in accordance with disclosed implementations.

FIG. 6 is a flow chart of a method 600 of viewing alignment in accordance with disclosed embodiments. At 602, a user executes the positioning app and views the display through the camera of the smartphone. At 604, a positioning algorithm in the app will determine the angles of each corner of the display as captured as an image in the camera. At 606 UI elements, such as the alignment box and arrows disclosed above, are displayed in connection with the display image. At 608, the user can adjust the position and angle of the phone with respect to the display until the UI indicates that the optimized position has been reached. The user can position their eyes in correspondence with the optimized position of the camera for best viewing of the display.

In the example above, the optimum position is along an orthogonal axis of the display. However, various displays can be optimized for various viewing positions and angles and the positioning algorithm of the app can be adjusted accordingly. One of skill in the art would readily be able to determine the desired apparent angles of edges of the display to create the appropriate positioning algorithm.

The disclosed implementations can be used in various scenarios. For example, a user might want to determine the best possible position for the best image quality of a streaming video from a video service. Disclosed implementations can be used to improve perceived image quality and reduce image aberrations such as Moire Patterns, Mach Banding, and display uniformity/consistency. Further, a content creator can provide the disclosed implementations to users to ensure that consumers have a tool to help make the content as accessible as possible. Disclosed implementations are self-assisted (requiring no outside intervention or specialized apparatus) and limits visual aberrations introduced by having the viewer off center which can help with image perception for the user, improving readability of text/captions.

The disclosed implementations can be applied to setting up furniture in a home theater (or seating in a commercial theater) to provide the optimal viewing experience. Every display orientation creates a unique "sweet-spot" for arranging seating allowing the best placement for seating. Further ergonomics can be improved by the disclosed implementations will provide actionable feedback to position the viewer in the most comfortable and adjust furniture and monitor positions in an ergonomic way.

A projectionist or production company can apply disclosed implementations to center the position of a projector. Projectors look best when centered relative to the screen (as projecting off center creates a 2D transform known as "keystoning"). Disclosed implementations help orient the user to where the ideal placement should be reducing keystoning and improving image projection quality. Outdoor Advertising is heavily regulated requiring specific limitations to placement relative to driving patterns. Disclosed implementations can be used to determine if a billboard is properly facing a road or highway.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

What is claimed:

1. A method for positioning a viewing device at an optimum viewing position relative to a display for viewing images rendered on the display, the display having a known two-dimensional shape and a known optimum viewing angle, the method comprising:
    (a) capturing an image of the display using a camera;
    (b) analyzing the image of the display by applying a positioning algorithm to determine a viewing angle corresponding to a position of the camera relative to the display;
    (c) displaying a user interface (UI) in connection with the image to indicate the viewing angle;
    (d) moving the camera; and
    (e) repeating steps (a)-(d) until an indicator of optimum positioning is displayed in the UI, whereby the camera is at an optimum viewing position.

2. The method of claim 1, wherein the known two-dimensional shape is rectangle.

3. The method of claim 2, wherein the UI includes a rectangle superimposed over the image of the display.

4. The method of claim 1, wherein the capturing, analyzing, displaying and presenting are accomplished by a smartphone.

5. The method of claim 1, wherein the viewing device included the eyes of a person.

6. The method of claim 1, wherein the viewing device is a camera.

* * * * *